US006278100B1

(12) United States Patent
Friedman et al.

(10) Patent No.: US 6,278,100 B1
(45) Date of Patent: Aug. 21, 2001

(54) SYNTHETIC GUIDE STAR FOR ON-ORBIT ASSEMBLY AND CONFIGURATION OF LARGE EARTH REMOTE SENSING OPTICAL SYSTEMS

(75) Inventors: Edward Jay Friedman, Golden; Brian Keith McComas, Erie, both of CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 09/304,661

(22) Filed: May 4, 1999

(51) Int. Cl.[7] .................................................. G02B 23/00

(52) U.S. Cl. ......................... 250/201.9; 356/121; 359/399

(58) Field of Search ............................... 250/201.9, 201.1; 356/121, 123, 124, 124.5, 125, 126, 127; 359/399, 419, 428, 429, 601

(56) References Cited

U.S. PATENT DOCUMENTS

| 2,966,823 | 1/1961 | Trimble . | |
|---|---|---|---|
| 3,961,179 | 6/1976 | Kuffer | 250/203 |
| 4,091,274 | 5/1978 | Angelbeck et al. | 250/201 |
| 4,123,136 | 10/1978 | Dahab et al. | 350/16 |
| 4,393,303 | 7/1983 | Spinhirne | 250/201 |
| 4,798,949 | 1/1989 | Wilcox et al. | 250/203 |
| 5,220,406 | * 6/1993 | Kishner | 356/360 |
| 5,291,333 | * 3/1994 | Mills et al. | 359/601 |
| 5,559,322 | 9/1996 | Jacoby et al. | 250/203.1 |
| 5,905,591 | * 5/1999 | Duncan et al. | 359/399 |

OTHER PUBLICATIONS

Alda, J. et al.; "Zernike-based matrix model of deformable mirrors: optimization of aperture size"; *Applied Optics*, vol. 32; May 1, 1993; pp. 2431–2438.

Babcock, H.; "the Possibility of Compensating Astronomical Seeing"; *Publ. Astronomical Society of the Pacific;* vol. 65; Oct. 1953; pp. 229–236.

Chun, M. et al.; "Increasing the useful field-of-view of an adaptive optics system"; *SPIE 3353;* Mar. 1998; pp. 384–390.

Collins, G.; "Making stars to see stars: DOD adaptive optics work is declassified"; *Physics Today;* vol. 45; Feb. 1992; pp. 17–21.

DeHainaut, C. et al.; "Design of a wide field of view phased array telescope"; *Optical Engineering;* vol. 27; Sep. 1988; pp. 736–739.

Ellerbroek, B.; "First-order performance evaluation of adaptive-optics systems for atmospheric-turbulence compensation in extended-field-of-view astronomical telescopes"; *JOSA A;* vol. 11; Feb. 1994; pp. 783–805.

Es kov, D. et al.; "Adaptive telescopes outside the atmosphere (development directions)"; *Journal of Optical Technology;* vol. 62; Oct. 1995; pp. 669–672.

Fienup, J.; "HST aberrations and alignment determined by phase retrieval algorithms"; *Space Optics for Astrophysics and Earth and Planetary Remote Sensing;* 1991; pp. 19–21.

Foy, R.; "Feasibility of adaptive telescope with laser probe"; *Astronomy and Astrophysics;* vol. 152; Nov. 1985; pp. L29–L31.

Fried, D.; "Limiting Resolution Looking Down Through the Atmosphere"; *JOSA;* vol. 56; Oct. 1966; pp. 1380–1384.

(List continued on next page.)

*Primary Examiner*—John R. Lee
(74) *Attorney, Agent, or Firm*—Sheridan Ross P.C.

(57) ABSTRACT

The present invention provides an adaptive optic system for an earth-viewing telescope on board an orbiting spacecraft. The adaptive optic system includes a deformable mirror, a synthetic guide star laser, and a control module that corrects not only on-axis wavefront error but also off-axis wavefront error.

29 Claims, 8 Drawing Sheets

OTHER PUBLICATIONS

Fugate, R.; "Laser Beacon: The Potential for Full Sky Atmospheric Compensation"; *Optics & Photonics New;* vol. 4; Jun. 1993; pp. 14–19.

Gaffard, J. et al.; "Adaptive optics for optimization of image resolution"; *Applied Optics;* vol. 26; Sep. 15, 1987; pp. 3772–3777.

Gardner, C. et al.; "Design and Performance Analysis of Adaptive Optical Telescopes using Laser Guide Stars"; *Proceedings of the IEEE;* vol. 78; Nov. 1990; pp. 1721–1743.

Gardner, C. et al.; "Sodium laser guide star technique for adaptive imaging in astronomy"; *SPIE;* vol. 1114; 1989; pp. 191–202.

Gavel, D. et al.; "Systematic design and analysis of laser–guide–star adaptive–optics systems for large telescopes"; *JOSA A;* vol. 11; Feb. 1994; pp.. 914–924.

Glindemann, A. et al.; "ALFA—The Laser Guide Star Adaptive Optics System for the Calar Alto 3.5m Telescope"; *Laser Technology for Laser Guide Star Adaptive Optics Astronomy;* 1997; pp. 120–125.

Gonglewski, J. et al.; "System design of a wavefront sensing package for a wide field of view optical phased array"; *Optical Engineering;* vol. 27; Sep. 1988; pp. 785–792.

Hardy, J.; "Adaptive optics—a progress review"; *SPIE;* vol. 1542; Jan. 17, 1991; pp. 2–17.

Hardy, J.; "Active Optics: A New Technology for the Control of Light"; *Proceedings of the IEEE;* vol. 66; Jun. 1978; pp. 651–698.

Harris, J. et al.; "Image structure form mirrors with print–through undulations: Theoretical analysis"; Applied Optics; vol. 36; Jul. 1, 1997; pp. 4571–4581.

Harvey, J. et al.; "Wavefront Error Compensation Capabilities of Multi–Actuator Deformable Mirrors"; *SPIE;* vol. 141; 1978; pp. 50–58.

Harvey, J. et al.; "Field–of–view limitations of phased telescope arrays"; *Applied Optics;* vol. 34; Sep. 1, 1995; pp. 5787–5798.

Johnston, D. et al.; "Analysis of multiconjugate adaptive optics"; *JOSA A;* vol. 11; Jan. 1994; pp. 394–408.

Kane, T. et al.; "Wavefront detector optimization for laser guided adaptive telescopes"; *SPIE;* vol. 1114; 1989; pp. 160–171.

Kibblewhite, E.J. et al.; "Performance of ChAOS on the Apache Point Observatory s 3.5m telescope"; *SPIE;* vol. 3353; Mar. 1998; pp. 60–71.

Mather, J. et al.; "NGST Capabilities and Design Concepts" *Astronomical Society of the Pacific Conference Series;* vol. 133; Apr. 7–9, 1997; pp. 3–22.

Meinel, A.; "Aperture synthesis using independent telescopes"; *Applied Optics;* vol. 9; Nov. 1970; pp. 2501–2504.

Meinel, A. et al.; "Active wavefront control challenges of the NASA Large Deployable Reflector (LDR)"; *SPIE;* vol. 1114; 1989; pp. 406–409.

Merkle, F. et al.; "Application of Adaptive Optics to Astronomy"; *SPIE;* vol. 1114; 1989; pp. 36–42.

Miao, C. et al.; "Design of wide–field arrays"; *SPIE;* vol. 1236; 1990; pp. 372–378.

Moore, K. et al.; "Zonal Model of an Adaptive Mirror"; *Applied Optics;* vol. 29; Nov. 1, 1990; pp. 4622–4628.

Page, N. et al.; "Design of wide field planetary camera 2 for Hubble space telescope"; *Space Optics for Astrophysics and Earth and Planetary Remote Sensing;* 1991; pp. 38–40.

Parenti, R. et al.; "Laser–guide–star systems for astronomical applications"; *JOSA A;* vol. 11; Jan. 1994; pp. 288–309.

Pearson, J.; "Adaptive Optics: A State–of–the–Art Report"; *Laser Focus World;* Sep. 1981; pp. 53–61.

Peterson, L. et al.; "Prospects for Low–Cost Mechanically Deployed Optical and Infrared Spacecraft Instruments"; *Proceedings of the IEEE Aerospace Conference;* Feb. 1997; pp. 247–254.

Plante, R.; "Large Active Mirror Program (LAMP)"; *SPIE;* vol. 1543; 1991; pp. 146–160.

Powers, M. et al.; "Assessment of a Large Aperture Telescope Trade Space and Active Opto–Mechanical Control"; IEEE Aerospace Conference Proceedings; 1997; pp. 197–229.

Redding, D. et al.; "Hubble space telescope prescription retrieval"; *Applied Optics;* vol. 32; Apr. 1, 1993; pp. 1728–1736.

Redding, D. et al.; "A Large–Telescope Natural Guide Star Adaptive Optics System"; *SPIE;* vol. 2201; 1994; pp. 619–629.

Roddier, C. et al.; "A combined approach to HST wave–front distortion analysis"; *Applied Optics;* vol. 32; Jun. 1, 1993; pp. 2992–3008.

Roggemann, M. et al.; "Widening the effective field of view of adaptive–optics telescopes by deconvolution from wavefront sensing: average and signal–to–noise ratio performance"; *Applied Optics;* vol. 34; Mar. 10, 1995; pp. 1432–1444.

Sasiela, R.; "Wave–front correction by one or more synthetic beacons"; *JOSA A;* vol. 11; Jan. 1994; pp. 379–393.

Scholl, M.; "Signal Generated by all Extra–Solar–System Plant Detected by a Rotating Rotationally Shearing Interferometer"; *JOSA A;* vol. 13; Jul. 1996; pp. 1584–1592.

Scholl, M. et al.; "Diffraction modeling of a Space Relay Experiment"; *Optical Engineering;* vol. 29; Mar. 1990; pp. 271–278.

Scholl, M. et al.; "Adaptive optics for in–orbit aberration correction: spherical aberration feasibility study"; *Applied Optics;* vol. 34; Nov. 1, 1995; pp. 7295–7301.

Scholl, M. et al.; Adaptive optics for in–orbit spherical aberration correction; *SPIE;* 2201; 1994; pp. 161–177.

Spinhirne et al.; "The Starfire Optical Range 3.5m Telescope Adaptive Optical System"; *SPIE;* vol. 3353; Mar. 1998; pp. 23–33.

Takami, F. et al.; "Adaptive optics system for Cassegrain focus of Subaru 8.2m telescope"; *SPIE;* vol. 3353; Mar. 1998; pp. 500–507.

Thomas, M.; "Inflatable Space Structures"; *IEEE Potentials;* Dec. 1992; pp. 29–32.

Tyle, G.; "Wave–front compensation for imaging with off–axis guide stars"; *JOSA A;* vol. 11; Jan. 1994; pp. 339–346.

Tyson, R.; "Using the deformable mirrors as a spatial filter: application to circular beams"; *Applied Optics;* vol. 21; Mar. 1, 1982; pp. 787–793.

Tyson, R.; "Adaptive optics system performance approximations for atmospheric turbulence correction"; *Optical Engineering;* vol. 29; Oct. 1990; pp. 1165–1173.

Tyson, R.; "Adaptive optics and ground–to–space laser communications"; *Applied Optics;* vol. 35; Jul. 1, 1996; pp. 3640–3546.

Vaughan, A. et al.; "Development of the Second Generation Wide Field Planetary Camera for HST"; *Optics & Photonics News;* Nov. 1993; pp. 17–21.

Welsh, B. et al.; "Performance Analysis of Adaptive–optics Systems Using Laser Guide Stars and Slope Sensors"; *JOSA A;* vol. 6; Dec. 1989; pp. 1913–1923.

Wilson, R.; "Active optics and the New Technology Telescope (NTT): the key to improved optical quality at lower cost in large astronomical telescopes"; *Contemporary Physics;* vol. 32; 1991; pp. 157–171.

Tyson, R. et al.; "The effect of wavefront sensor characteristics and spatiotemporal coupling on the correcting capability of a deformable mirror"; *SPIE;* vol. 228; 1980; pp. 21–25.

* cited by examiner

SYNTHETIC GUIDE STAR FOR ON-ORBIT ASSEMBLY AND CONFIGURATION OF LARGE EARTH REMOTE SENSING OPTICAL SYSTEMS

FIELD OF THE INVENTION

The present invention is directed generally to remote sensing optical systems and specifically to adaptive optics for remote sensing optical systems.

BACKGROUND

Space-based remote sensing optical systems are widely used in military, scientific, and commercial applications for viewing the earth and its atmosphere. Space-based remote sensing optical systems typically include a large monolithic primary mirror, one or more smaller monolithic secondary mirrors, and a camera for capturing images.

Space-based remote sensing optical systems that form images of the earth have shown a steady progression toward smaller ground resolution and more spectral information (i.e., a higher degree of color detection or spectral resolution). In the early 1970's, for example, Landsat was able to produce four visible color bands with a ground resolution of about 100 meters in dimension. The next generation of commercial systems will produce hundreds of wavelength bands with a ground resolution of about 1 meter in dimension.

To accommodate the dual needs for small ground resolution and more spectral information, the size of the collecting aperture in the optical system must increase. For example, a Landsat-like orbit of 1,000 km requires a primary mirror aperture of 6 meters to produce a ground resolution of 6 inches. To make hyperspectral images at the one meter pixel size, the radiometrics of the scene and the demand for high signal-to-noise ratio will require an even further increase in the mirror diameter. In addition, any remote sensing system deployed at geosynchronous orbit (~36,000 km from earth) will also require larger apertures.

The launch of a monolithic primary mirror large enough to provide the needed ground resolution and spectral information is unlikely due to cost and launch vehicle availability. For these reasons, the primary mirror will likely have to be erected in space after launch using technology such as a rigid or flexible segmented mirror, an electrostatically-controlled membrane mirror, an inflatable primary mirror, an unfurled or rolled mirror, a mirror constructed in space, a sparse aperture mirror, and discrete mirrors in optical communication with one another deployed on separate spacecraft. In each case, the mirror shape will only approximate what is needed to achieve high quality imagery.

In all of these systems, the figure and position of the primary mirror and the position and orientation of the secondary mirror will be somewhat in error, which can significantly adversely impact the operation of the optical system. As used herein, the "figure" of a mirror means the shape of its reflecting surface. After erection, the primary mirror will commonly have a figure which is flawed and be misaligned relative to the secondary mirror. Even when the primary mirror figure and alignment is correct after erection, the mirror figure and alignment will typically change as the spacecraft flies into and out of the earth's shadow (due to the thermal load on the mirror) and as the spacecraft vibrates due to the operation of on-board stabilization equipment. Unlike earth-based mirrors, spaced-based mirrors are typically very flexible and therefore have increased sensitivity to thermal loading and equipment vibration. An incorrectly shaped mirror can cause portions of the wavefront of the radiation to be out of phase with respect to other portions of the wavefront, thereby causing the mirror to work as a series of discrete mirrors rather than as a single mirror. As used herein, "phase" refers to the pathlength of the radiation ray multiplied by $2\pi/\lambda$ (where $\lambda$ is the wavelength of the radiation ray). The rms phase error across the wavefront (i.e., wavefront error) should not exceed about 1 rad, which corresponds to a path length error of about $1\times10^{-7}$ m (1,000 Å) at the peak visible wavelength to achieve a useful degree of coherence. The required position accuracy of a mirror surface at normal incidence is on the order of this value. "Phase error" is the pathlength error of a radiation ray multiplied by $2\pi/\lambda$.

Ground-based telescopes suffer from similar limitations. Modern large astronomical telescopes use thin, flexible mirrors and must sense and reject the effects of wind mechanisms within the telescope and gravitational effects. The latter occur because tracking of stars causes the telescope to tilt, thus changing the gravitational forces on the mirror and telescope structure. For modern astronomical telescopes, the phasing and alignment of the optical system and correction for wavefront errors caused by atmospheric distortions are provided by a guide star or beacon. Radiation from the guide star or beacon can be used to generate electrical signals and align the mirrors and correct for wavefront errors. In earth-viewing optical systems, unlike space-viewing optical systems, there is typically no light source of sufficient intensity and/or duration to permit phasing and alignment of the optical system to occur.

SUMMARY OF THE INVENTION

It is an objective of the present invention to provide a remote sensing system having a high ground resolution and/or ability to obtain hyperspectral images. Related objectives include providing adaptive optics and a synthetic guide star to select the shape and position of the primary mirror and position and orient the secondary mirror of the remote sensing system, thereby substantially minimizing the impact of wavefront defects in the operation of the remote sensing system.

In one embodiment, the present invention provides a spaced-based optical system for viewing a celestial body, particularly the earth. The optical system is mounted on a spacecraft and includes:

(a) a primary mirror, which is typically a nonmonolithic mirror that is erected after launch of the spacecraft;

(b) a secondary mirror in optical communication with the primary mirror;

(c) optionally additional mirrors to optimize the character of the light field projected to the focal plane;

(d) a deformable mirror in optical communication with one or more of the previous mirrors;

(e) a plurality of actuators engaging at least one of the primary, secondary, optional subsequent, and deformable mirrors for forming the mirror surfaces into a plurality of differing shapes and orientations;

(f) a plurality of actuators to control the position and orientation of at least one of the mirrors; and (g) a controller for forwarding a control signal to each of the plurality of actuators for position, orientation, or shape controller in response to a selected optical parameter to form the mirror and/or mirror system into one of the plurality of differing shapes. The primary mirror can include a segmented mirror, an electrostatically-controlled membrane mirror, an inflated mirror, an unfurled or rolled mirror, a mirror constructed in space, a sparse aperture mirror, and discrete mirrors deployed on separate spacecraft. The deformable mirror is commonly in optical communication with the primary mirror by means of the secondary or another mirror. As used herein, "optical communication" means that one mirror can receive radiation reflected by another mirror either directly or indirectly through one or more intermediate mirrors.

The optical system can include additional components to provide a synthetic guide star. These components include:

(h) a wavefront sensor in optical communication with the primary, secondary, optional subsequent, and/or deformable mirrors for measuring a wavefront of radiation reflected by the primary, secondary and/or deformable mirrors;

(i) a controller for receiving a signal indicative of the wavefront measurement and generating a control signal to displace, orient, or reshape the primary, secondary, optional subsequent, and/or deformable mirrors; and (j) a radiation source for emitting primary radiation, the primary radiation being directed by the primary, secondary and/or deformable mirrors (of the telescope or optical system) into the atmosphere of the celestial body to create secondary radiation that is received by the telescope and directed to the wavefront sensor.

The radiation source is preferably a laser. The laser provides secondary radiation to the optic system through the mechanisms of Rayleigh scattering or resonant fluorescence.

The optical system can also perform tilt control and focus control. Each of the tilt and focus controllers forward appropriate control signals to the actuators attached to the secondary or other rigid mirror.

The optical system is able to substantially minimize the adverse impact of wavefront errors by using actuators to control the figure and location of the primary and/or deformable mirrors and the location and orientation of the secondary mirror and other mirrors, including the orientation of flat steering mirrors. The optical system is able not only to phase a large, primary, nonmonolithic mirror after erection, particularly including a mirror in an optical system having a wide field of view, but also to phase continuously the primary mirror as the mirror's shape changes during spacecraft flight and to use the deformable mirror to provide the additional refinement necessary for high quality imaging. The optical system is able to obtain high ground resolution and hyperspectral images through the use of larger primary mirrors than have heretofore been used on spacecraft.

In another embodiment of the present invention, a methodology is provided for adjusting the primary, secondary, subsequent, and/or deformable mirrors. The method includes the steps of:

(a) determining a respective amplitude for each of the actuators engaging the primary, secondary or deformable mirror based on a wavefront error at a nonzero field angle within a field of view of the optical system;

(b) generating a respective control signal for each of the plurality of actuators based on the respective amplitude; and (c) displacing each of the plurality of actuators based on the respective control signal.

These steps can be performed for only a portion (whether on- or off-axis) or for the entire field of view. As used herein and as shown in FIGS. 2 and 3, "field of view" refers to a volume in space, which is typically a cone, that is defined by the entire set of radiation rays that may be accepted by the optical system. The "field of view angle" is the angle between the outermost surface of the field of view and the optical axis. Stated another way, the determining step (a) can be performed for one or more of the field angles within the field of view of the primary mirror. As used herein, a field angle is any angle measured from the optical axis that is less than or equal to the field of view angle. The determining step (a) can thus be performed to correct both on-axis and off-axis wavefront errors. Preferably, the determining step is performed in accordance with the following equation:

$$\omega_m(x, y) = [m'(x, y) \otimes \{m'(x, y) \otimes \omega(x, y)\} \text{comb} \left(\frac{x}{\Delta x}, \frac{y}{\Delta y}\right)](M_\infty \sin(\theta)/\sin(M_\infty \theta)), \text{ where}$$

$\omega_m(x,y)$ defines the deformable mirror surface;
$m'(x,y)$ is the influence function of the plurality of actuators;
$\omega(x,y)$ is the wavefront error of the primary mirror;
x is the position along the x axis at the deformable mirror;
y is the position along the y axis at the deformable mirror;
$\Delta x$ is the distance between adjacent actuators in the x axis at the deformable mirror;
$\Delta y$ is the distance between adjacent actuators in the y axis at the deformable mirror;
M is the angular magnification of optical system;
$\theta$ is the nonzero field angle;
$\otimes$ refers to convolution; and
comb refers to a comb function.

As used herein and as shown in FIGS. 2 and 3, "angular magnification" is the ratio of the output ray angle relative to the optical axis to the input ray angle relative to the optical axis and "influence function" refers to the shape of the deformable mirror surface when an actuator is moved from its nominal position (i.e., the position where the mirror surface is flat) to another position. This equation assumes that the actuators are spaced on a uniform rectangular grid with all actuators performing identically. As will be appreciated, nonrectangular grids may also be used, if it is found to provide more effective control of image quality.

Using the above equation, substitution of the field of view angle for $\theta$ yields an equation for the shape of the deformable mirror that substantially minimizes the residual wavefront error over the entire field of view. Substitution of a field angle that is less than the field of view angle yields a deformable mirror shape that substantially minimizes the residual wavefront error from the optical axis radially outward to the field angle but does not substantially minimize the residual wavefront error between the field angle and the field of view angle.

The equation can include a weighting function that yields an equation for the shape of the deformable mirror that substantially minimizes the wavefront error over only a selected portion of the field of view. For example, a weighting function can be selected that substantially minimizes the residual wavefront error in off axis portions of the field of view only.

The use of weighting functions provides a high degree of versatility for the optical system. For example, if at a first time an object in the field of view is located at the nonzero field angle and at a second time that is different from the first time the object is in the field of view and is located at a second field angle that is different from the nonzero field angle, the method can include the additional steps of:

(d) determining a second respective amplitude for each of the actuators based on the wavefront error at the second field angle;

(e) generating a second respective control signal for each of the plurality of actuators based on the second respective amplitude; and (f) displacing each of the plurality of actuators based on the second respective control signal.

In yet another embodiment of the present invention, a methodology is provided for phasing and adjusting the figure and position of the primary mirror, the location and orientation of the secondary mirror, and/or the figure and position of the deformable mirror using a synthetic guide star. The method includes the steps of:

(a) illuminating a selected area of atmosphere surrounding the celestial body with radiation to produce secondary radiation;

(b) directing the secondary radiation using at least the primary mirror and a moveable secondary mirror to a wavefront sensor;

(c) detecting a wavefront of the secondary radiation with the wavefront sensor;

(d) forwarding a signal indicative of the wavefront to a controller; and (e) generating a control signal in response to the signal to control the figure or phase of at least one of the primary and secondary mirrors. Typically, the control signal will control the figure and position of the primary and/or deformable mirrors and the position and orientation of the secondary mirror. As will be appreciated, these steps can be used in conjunction with the adaptive optics described above to select the shape and position of the primary mirror where a natural beacon or guide star is absent.

DETAILED DESCRIPTION

Figure 1:
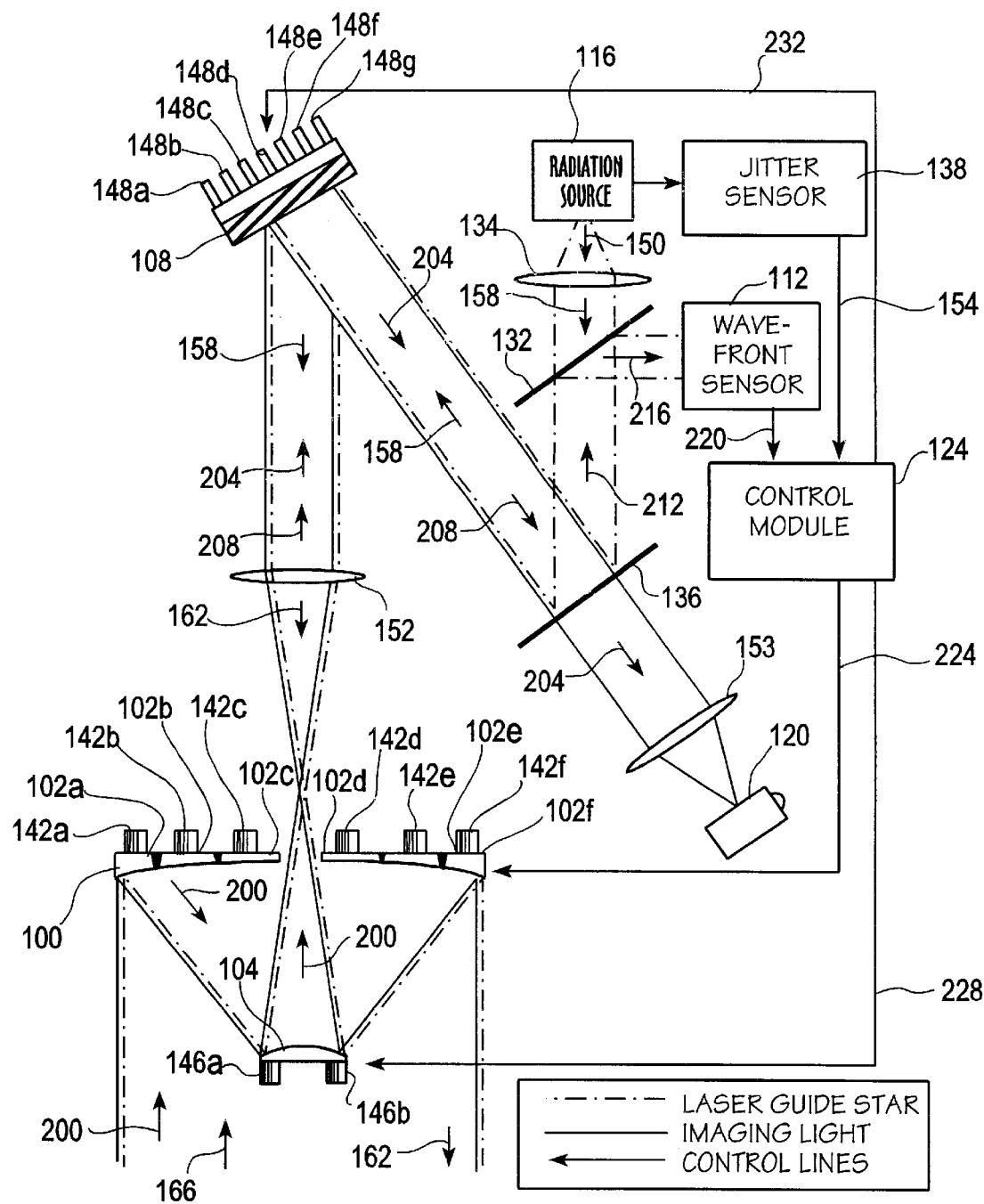
FIG. 1 depicts an adaptive optic system according to the present invention.
Figure 2:
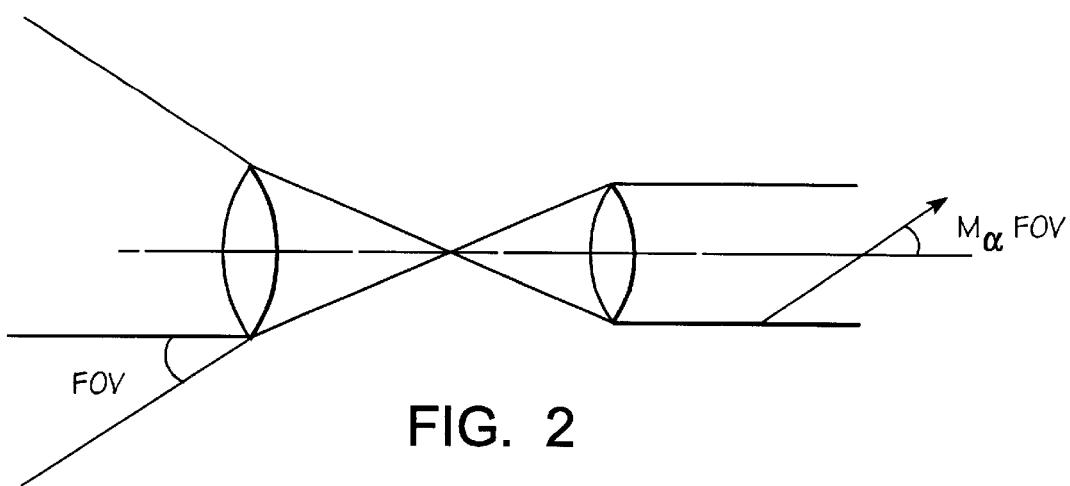
FIG. 2 depicts the optical axis, field of view, the angular magnification, and field angle for an optical system.
Figure 3:
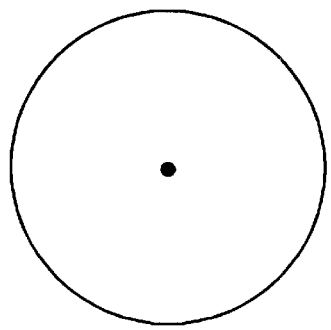
FIG. 3 is a plan view of the field of view of FIG. 2 showing the optical axis.

A typical optical system according to a first embodiment of the present invention is depicted in FIG. 1. The optical system includes a segmented primary mirror 100 (having a plurality of discrete segments (102a–f)), a secondary mirror 104, collimators 152 and 153, an adaptive optic system, a beamsplitter 136, and a science camera 120. The adaptive optic system includes a deformable mirror 108, a second beamsplitter 132, a wavefront sensor 112, a radiation source 116, a second collimator 134, a jitter sensor 138, and a control module 124.

The primary mirror 100 can be any concave or convex mirror capable of accepting the desired field of view for the optical system while fitting within a conventional launch vehicle. Preferably, the field of view angle of the primary mirror 100 is at least about 1 degrees and more preferably from about 1 to about 150 degrees. Typically, the primary mirror 100 is a deployable rigid or flexible nonmonolithic mirror having a diameter of at least about 4 meters and more typically ranging from about 4 to about 50 meters. The nonmonolithic mirror can include a segmented mirror, an electrostatically controlled membrane mirror, an erected flexible segment mirror, an inflatable primary mirror, an unfurled or rolled mirror, a mirror constructed in space, a sparse aperture mirror, and discrete mirrors deployed on separate spacecraft. A plurality of actuators 142-g engage a rear surface of the primary mirror 100 to permit the correction of higher order aberrations in the wavefront by forming the primary mirror 100 into a plurality of differing shapes.

The secondary mirror 104 can be a monolithic or nonmonolithic concave or convex mirror. Typically, the secondary mirror is a deployable, segmented mirror. The secondary mirror preferably has a number of degrees of freedom (e.g., 5) to help correct the optical system. A plurality of actuators 146a–b engage a rear surface of the secondary mirror to permit the correction of low order aberrations in the wavefront.

The deformable mirror 108 is typically (but not necessarily) segmented and an exact duplicate of the larger primary mirror. The common configuration of the primary and deformable mirrors permits the rapid correction of step function misalignments in the primary mirror's segments and other low order aberrations in the wavefront. To form the mirror into a plurality of differing shapes, a plurality of actuators 148a–g engage a rear surface of the deformable mirror. The number of actuators 148a–g engaging the deformable mirror typically are equal to or greater than the number of actuators 142a–f engaging the rear surface of the primary mirror and are typically distributed in a similar configuration to the actuators 142a–f engaging the primary mirror.

The two dimensional distribution of the actuators for any of the mirrors depends on the particular application. Typically, the actuators for the primary and deformable mirrors are distributed in a rectangular grid with the distances between adjacent actuators being substantially identical across the grid. As will be appreciated, the actuators can be distributed in other geometrical shapes, such as a circle, an ellipse, a polygon, and the like.

The wavefront sensor 112 can be any suitable wavefront sensor that measures the wavefront across a plurality of subapertures, with a "SHACK-HARTMANN" wavefront sensor being an example. Each subaperture contains an individual sensor. The wavefront measured by each sensor is assumed to represent the wavefront across the entire corresponding subaperture.

The control module 124 receives the plurality of measurements from the plurality of sensors in the wavefront sensor 112 and constructs a representation of the wavefront based on the measurements. The representation of the wavefront is compared to a perfect wavefront, which is typically spherical in shape. The deviation of the wavefront representation from the perfect wavefront is considered to be the wavefront error. Based on the wavefront error, the control module generates appropriate control signals to the actuators engaging the primary, secondary, and deformable mirrors to adjust the shape, position, and/or orientation of the appropriate mirror to substantially minimize the wavefront error over all or a selected portion of the field of view.

The control signals are typically generated for the deformable mirror using the following equation:

$$\omega_m(x, y) = [m'(x, y) \otimes \{m'(x, y) \otimes \omega(x, y)\} comb \left(\frac{x}{\Delta x}, \frac{y}{\Delta y}\right)](A/B), \text{ where} \quad (1)$$

$\omega_m(x,y)$ defines the deformable mirror surface;

$m'(x,y)$ is the influence function of the plurality of actuators engaging the rear of the deformable mirror;

$\omega(x,y)$ is the wavefront error of the primary mirror;

x is the position along the x axis at the deformable mirror;

y is the position along the y axis at the deformable mirror;

$\Delta x$ is the distance between adjacent actuators in the x axis at the deformable mirror; and $\Delta y$ is the distance between adjacent actuators in the y axis at the deformable mirror. This equation assumes a rectangular grid distribution of the actuators with all actuators performing identically. A and B are constants that vary depending upon the portion of the field of view over which the residual wavefront error is to be substantially minimized. For example, a weighting function can be used to selectively include and exclude portions of the field of view from the calculation. Typically, A/B is represented by the following:

$$M \sin(\theta)/\sin(M\theta), \text{ where} \quad (2)$$

M is the angular magnification of optical system; and $\ominus$ is the nonzero field angle.

Figure 4:
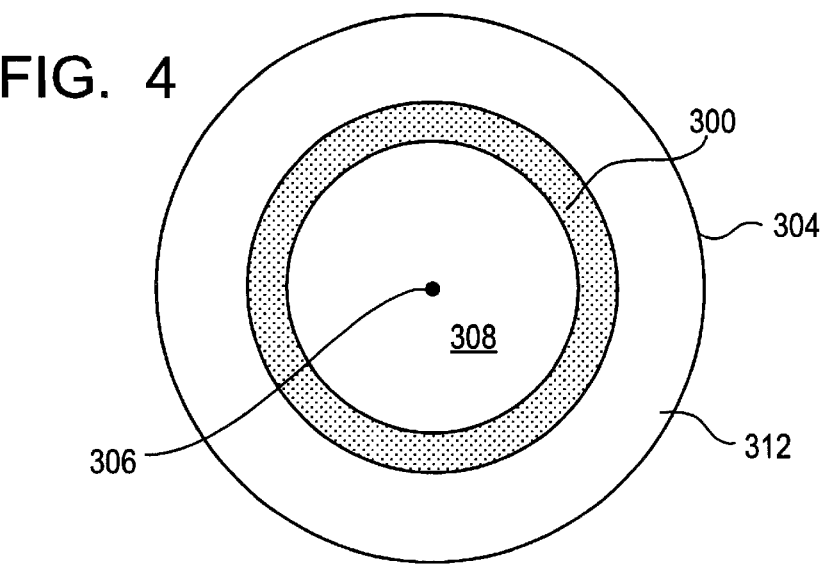
FIG. 4 is a plan view of a field of view showing the effect of a weighting function on the minimization of the residual wavefront error.

FIG. 4 illustrates the use of a weighting function in equation 1. In FIG. 4, the residual wavefront error is substantially minimized for only an off-axis portion 300 of the field of view 304. The portion 300 is symmetrical about the optical axis 306. In the unshaded portions 308 and 312, the residual wavefront error is not substantially minimized. A weighting function may also be used to substantially minimize wavefront error over a portion of the field of view that is not symmetrical about the optical axis 313.

Figure 5:
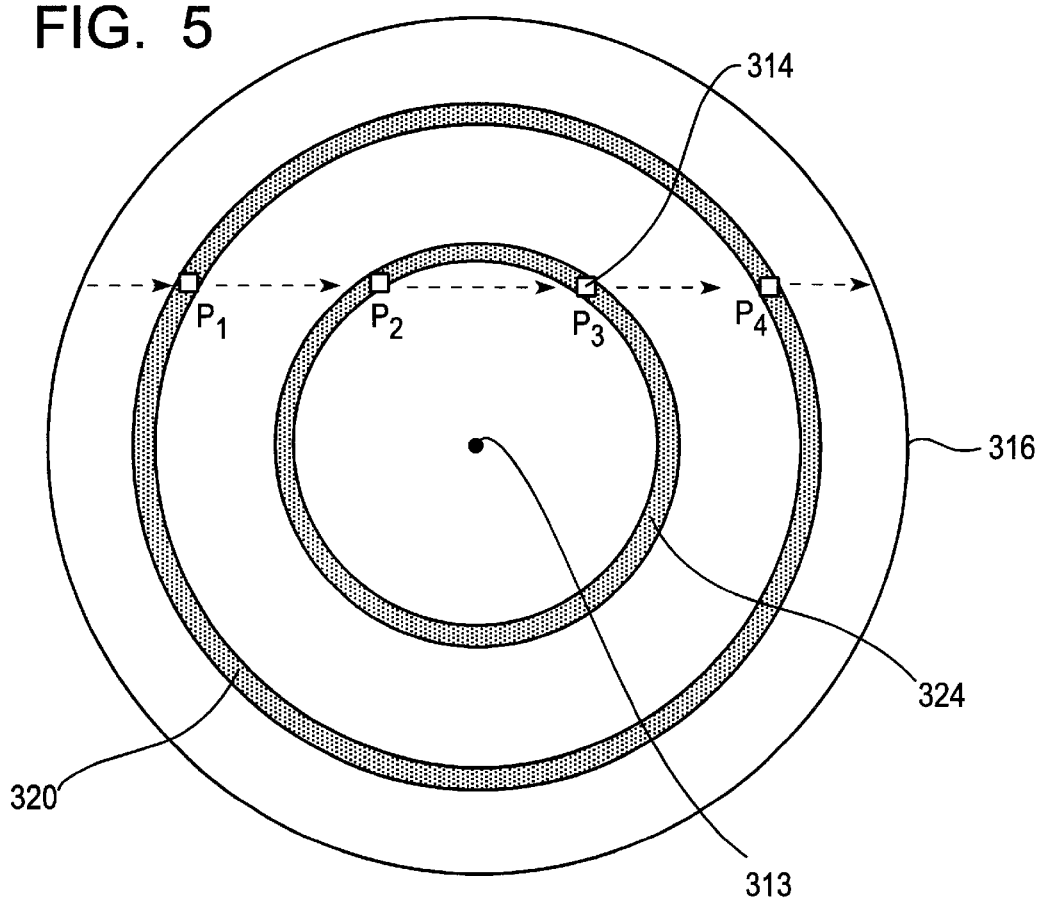
FIG. 5 is a plan view of a field of view showing the movement of an object across the field of view.

Referring to FIG. 5, the sequential use of a multiplicity of differing weighting functions is illustrated for an object 314 moving linearly across the field of view 316. At position $P_1$ of the object 314 at a first time interval, the residual wavefront error is substantially minimized for a first portion 320 of the field of view 316 using a first weighting function. At a second position $P_2$ of the object at a second later time interval, the residual wavefront error is substantially minimized over a second portion 324 of the field of view 316. These steps are sequentially repeated using the same or different weighting functions at points $P_3$ and $P_4$ of the object 314.

Finally, the adaptive optical system includes a radiation source 116 as a synthetic beacon and a jitter beam sensor 138. The radiation source 116 can be any suitable radiation emitter, with a laser being most common. The laser can be an infrared laser, a visible laser, an ultraviolet laser and the like. The power of the laser typically ranges from about 10 mJ to about 100 J and the wavelength of the laser typically ranges from about 200 nm to about 20 microns. The radiation source 116 is positioned to illuminate the atmosphere of the celestial body. The emitted radiation can form secondary radiation through resonant fluorescence, Rayleigh scattering, or some another technique.

For a resonant fluorescence beacon, it is important that the laser not cause the sodium layer to saturate. In this case, when the sodium layer is saturated, the sodium atomic levels are inverted. Therefore, when the sodium layer is saturated, the radiation from the synthetic beacon is the result of stimulated emission rather than spontaneous emission. To prevent the sodium layer from saturating, the laser pulse length must not be longer than $$\Delta t = \frac{E \lambda_1 T_A \sigma_T \tau_S}{2\pi \Delta \rho_{RMS}^2 hc}, \text{ where} \quad (3)$$

$T_A$ is the one-way atmospheric transmission;

E is the laser energy per pulse;

$\lambda_L$ is the laser wavelength (e.g., 589 nm);

h is Plank's constant ($6.63 \times 10^{-34}$ Js);

c is the speed of light (m/s)

$\Delta \rho^2_{rms}$ is the laser beam cross section (M);

$\tau_S$ is the saturation time.

A Rayleigh beacon is similar to a resonant fluorescence beacon. Most of the equations governing the Rayleigh beacon are the same as the resonant fluorescence beacon. However, since the scattering mechanism is different, the photon flux equation is different.

Figure 6:
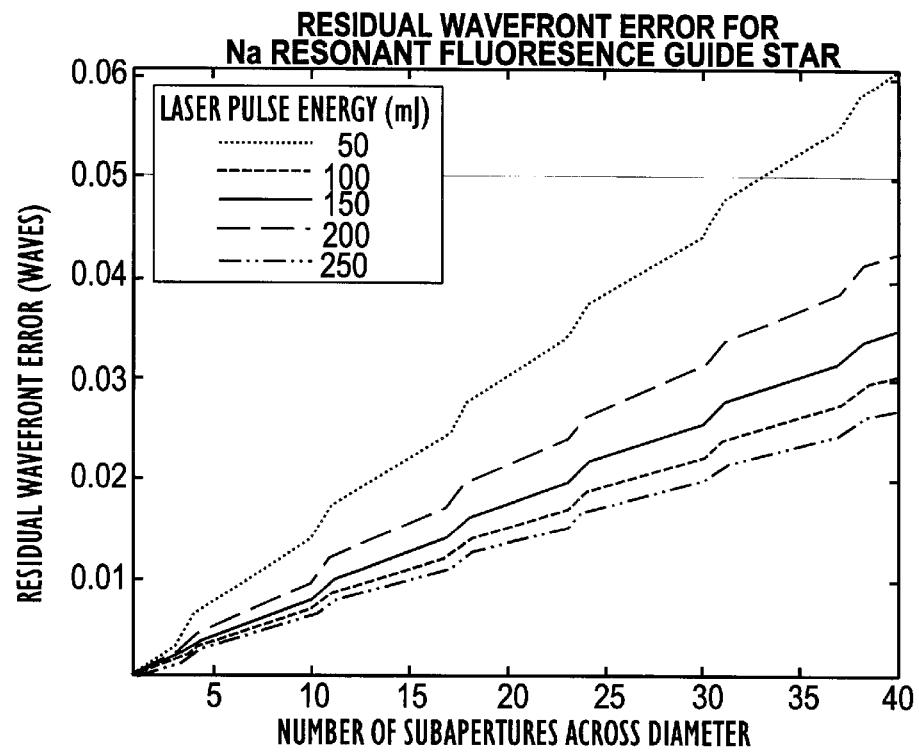
FIG. 6 depicts the residual wavefront error for a resonant fluorescence synthetic guide star.
Figure 7:
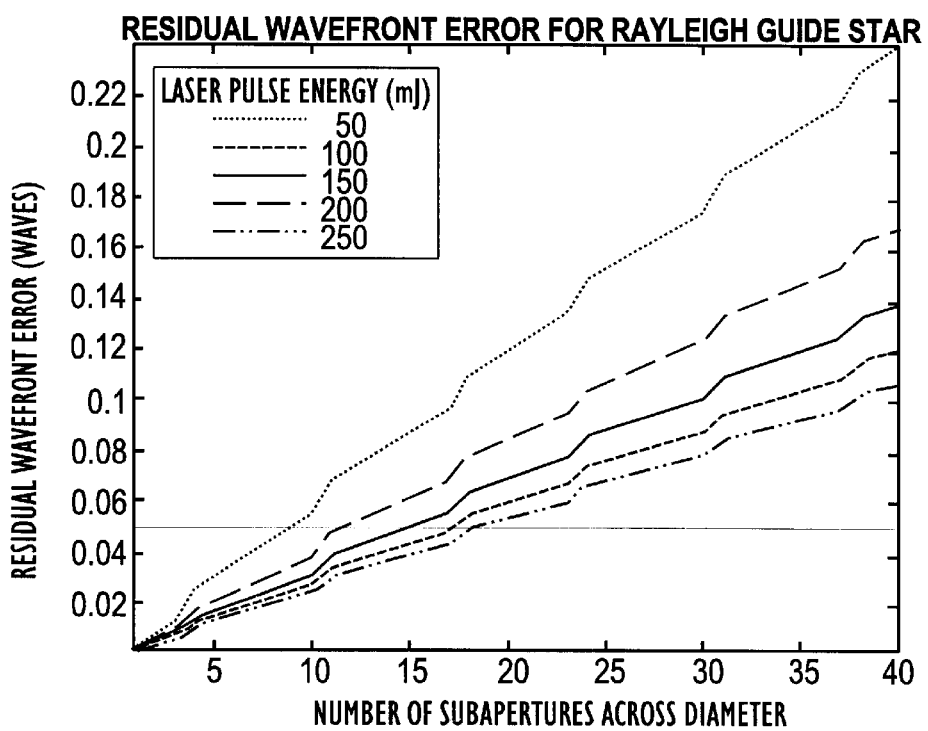
FIG. 7 depicts the residual wavefront error for a Rayleigh guide star.

FIG. 6 depicts the residual wavefront error for a resonant fluorescence beacon while FIG. 7 depicts the wavefront error for a Payleigh beacon.

The jitter sensor 138 measures any imperfections in the omitted radiation 150 and generates a signal 154 to the control module 124. The control module 125 uses the signal 154 to adjust the wavefront error to exclude the imperfections in the emitted radiation 150.

The optical system can further include a tilt mirror (not shown) to maintain the field of view in a desired location as the spacecraft moves in space. Alternatively, the secondary mirror can perform not only focus correction but also tilt control.

The operation of the optical system can be performed in one of two modes. In the first mode, the optical system is viewing an object. In this mode, incoming (image) radiation 200 which contains an image of the object is directed by the primary mirror 100 to a secondary mirror 104, from the secondary mirror 104 past a focal point and through a collimator 152 to form a parallel beam 204. The parallel beam 204 is directed by the deformable mirror 108 through collimator 153 and to the science camera 120 for capture of the image.

In a second mode, the optical system is corrected for the adverse effects of wavefront error on image quality. In this mode, the radiation source emits primary radiation 150 outwardly into the atmosphere. The primary radiation 150 passes through collimator 134 and is formed into a second parallel beam 158. The parallel beam 158 is passed through beamsplitters 132 and 136 and directed to the deformable mirror 108. The beam 158 is then directed through the collimator 152 and formed into a focused beam 162. The focused beam 162 is directed by the secondary mirror 104 to the primary mirror loo, and the primary mirror 100 directs the focused beam 162 outwardly into the isoplanatic patch surrounding the spacecraft.

Secondary radiation 166 is thereafter generated by phenomena such as Rayleigh scattering or resonant scattering and accepted by the optical system. The secondary radiation 166 follows the same path as the radiation 200. Specifically, the secondary radiation 166 is directed by the primary mirror 100 to the secondary mirror 104 and by the secondary mirror 104 to the collimator 152. The collimator 152 forms the secondary radiation 148 into a parallel beam 208. The parallel beam 208 contacts the deformable mirror 108 and is directed by the deformable mirror to the beamsplitter 136. A portion 212 of the parallel beam 208 is directed by the beamsplitter 136 to the beamsplitter 132. A portion 216 of the beam 212 is directed to the wavefront sensor 112 by the beamsplitter 132. The wavefront sensor 112 measures the defects in the wavefront of the secondary radiation 166 and generates a signal 220 indicative of the wavefront. The signal 220 is received by the control module 124 along with the signal 154 from the jitter sensor 138 indicating the defects in the primary radiation 150.

The control module uses the signal 220 to reconstruct the wavefront of the secondary radiation 166 and compares the reconstructed wavefront to a perfect wavefront, which is a perfect sphere. The differences between the wavefronts are then adjusted to eliminate the wavefront defects in the primary radiation 150 and yield the wavefront error in the optical system. Based on the wavefront error in the optical system appropriate control signals 224, 228, and 232 are generated by the control module 124 such as by using the equation noted above. In response to the respective control signal 224, 228, or 232, at least one of the following events occurs: (a) the actuators 142a–f engaging the primary mirror 100 are displaced to alter the figure and/or orientation of the primary mirror 100; (b) the actuators 146a, b engaging the secondary mirror 104 are displaced to alter the orientation and/or position of the secondary mirror 104; or (c) the actuators 148a–g engaging the deformable mirror 108 are displaced to alter the shape of the deformable mirror 108, thereby reducing or eliminating the defects in the wavefront.

EXPERIMENTAL

The performance of a one-dimensional counterpart of equation 1 above was compared to a one-dimensional model used to perform adaptive optics on an earth-based astronomical telescope. The former equation is the following:

$$\omega_m = H(H^tH)^{-1} H^t_\omega (M \sin(\theta)/\sin(M\theta)), \text{ where} \quad (4)$$

$\omega_m$ defines the deformable mirror surface;

H is a matrix in which each column contains the influence function of an actuator;

$\omega$ is the on axis wavefront error;

M is the angular magnification of the optical system;and $\theta$ is the field angle.

The latter equation is as follows:

$$\omega_m = H(H^tH)^{-1} H^t\omega. \quad (5)$$

Equation 5 is inapplicable to an earth observing telescope. In earth viewing systems, the incorrect primary mirror is at the entrance pupil, and the correction is performed with a deformable mirror at a pupil image. The deformable mirror is located at image of the primary mirror in the optical system and, in most cases, it will be much smaller than the primary mirror. Due to the Lagrange invariant, the incidence angles are correspondingly larger at the deformable mirror than at the primary mirror. This fact combined with the larger field angle makes equation 5 inapplicable. Equation 4 combines the field angle along with the angular magnification of the optical system.

Figure 8:
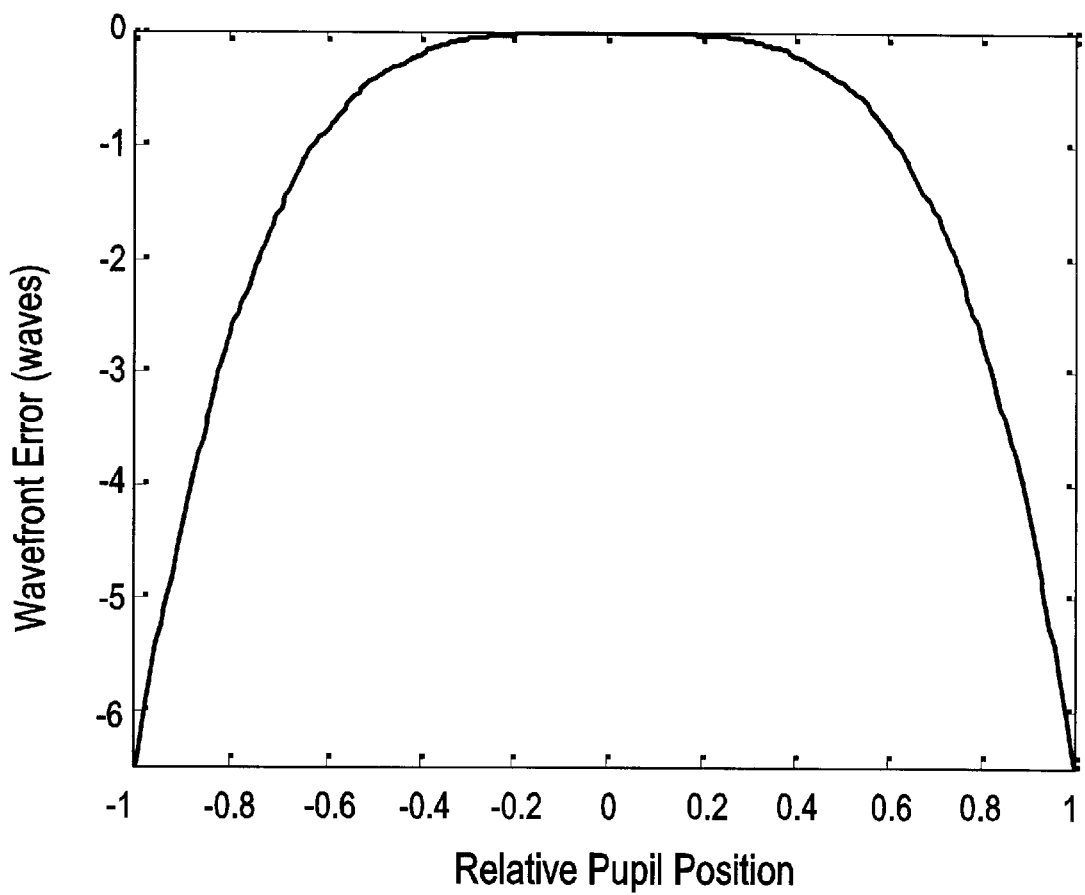
FIG. 8 is a plot of wavefront error (vertical axis) and position in the entrance pupil of the primary mirror (horizontal axis)

The primary mirror in the model is 2.4 m in diameter with 6.5 waves of spherical aberration peak-to-valley (FIG. 8). The actuators are spaced at one-half of the Nyquist sampling frequency. The influence function is modeled as a Gaussian with 20% coupling between adjacent actuators. The angular magnification of the optical system is set to 20×.

Figure 9:
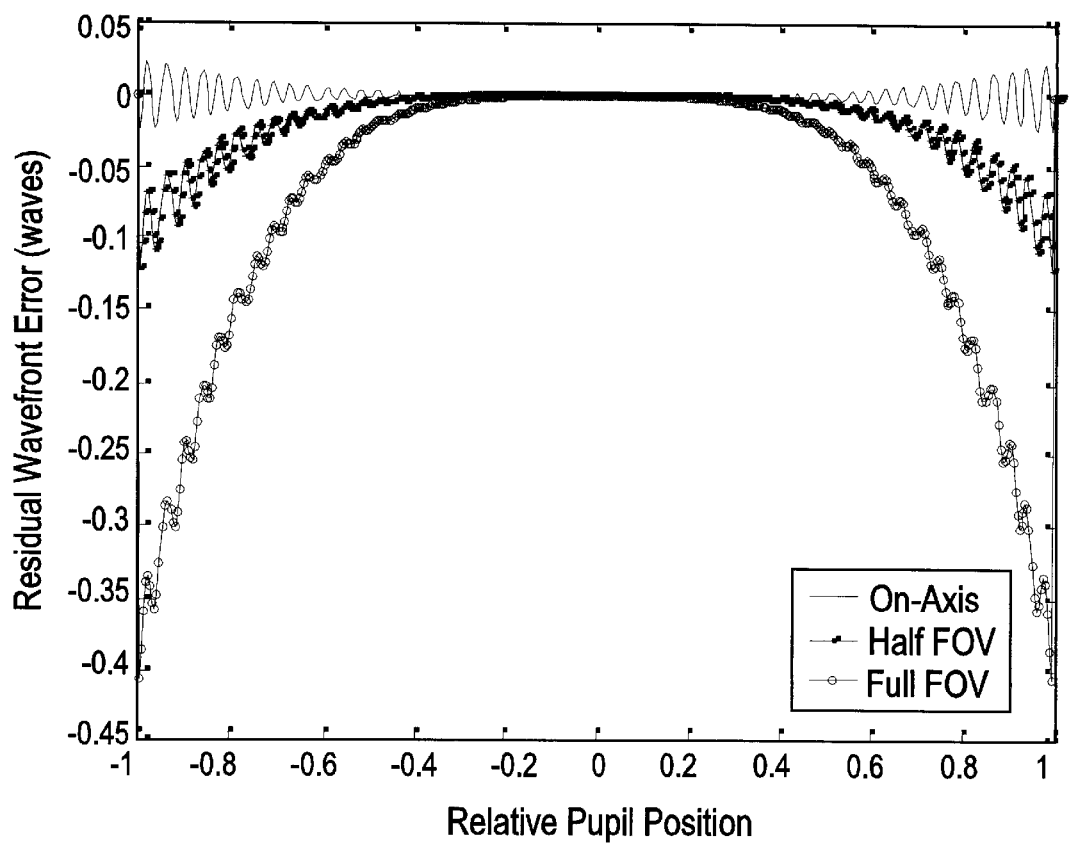
FIG. 9 depicts the residual wavefront error (vertical axis) versus relative pupil position for the primary mirror (horizontal axis) using equation 5.

The model results using equation 5 are depicted in FIG. 9. As can be seen from FIG. 9, equation 5 corrects for on-axis wavefront error but not for off-axis wavefront error. Accordingly, off-axis wavefront correction gets progressively worse as one moves away from the optical axis. The residual wavefront error at all field angles is improved over the initial wavefront error at the primary mirror; however, all of the field angles are not corrected equally. The Strehl ratio for on-axis field point is 0.99, but the Strehl ratio drops to 0.62 at the edge of the field.

Figure 10:
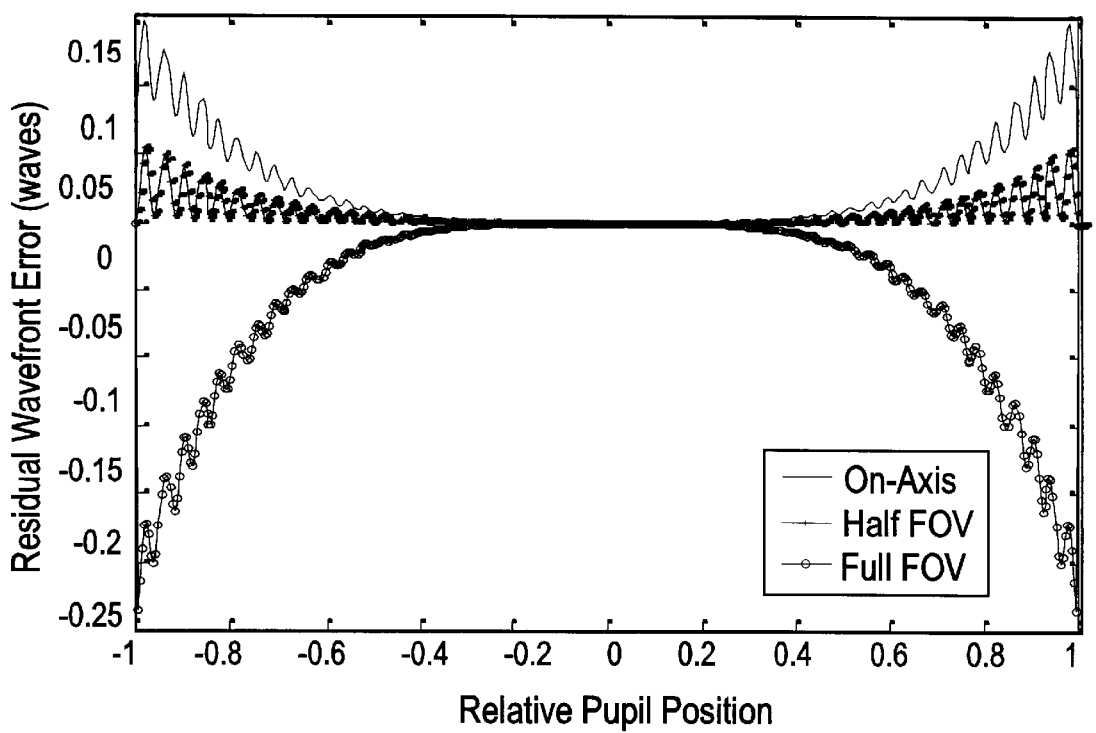
FIG. 10 depicts the residual wavefront error (vertical axis) versus relative pupil position for the primary mirror (horizontal axis) using equation 4.

The model results using equation 4 are depicted in FIG. 10. As can be seen from FIG. 10, equation 4 corrects for both on-axis and off-axis wavefront error. In FIG. 10, the Strehl ratio is lowered for the on-axis case but the edge of the field of view is greatly improved relative to FIG. 9. The on-axis Strehl ratio is reduced only slightly to 0.95; however, at the edges of the field of view the Strehl ratio is improved from 0.62 to 0.82. Since the Strehl tolerance level is 0.8, equation 4 results in good image quality across the entire field of view.

A weighting function can be added to equation 4. The weighting function will change the actuator values and the wavefront correction. As an example, a linear weighting function was applied. The linear weighting function is that set forth in the following equation:

$$W(\theta) = \theta/FOV, \text{ where FOV is the field of view angle.} \quad (6)$$

Figure 12:
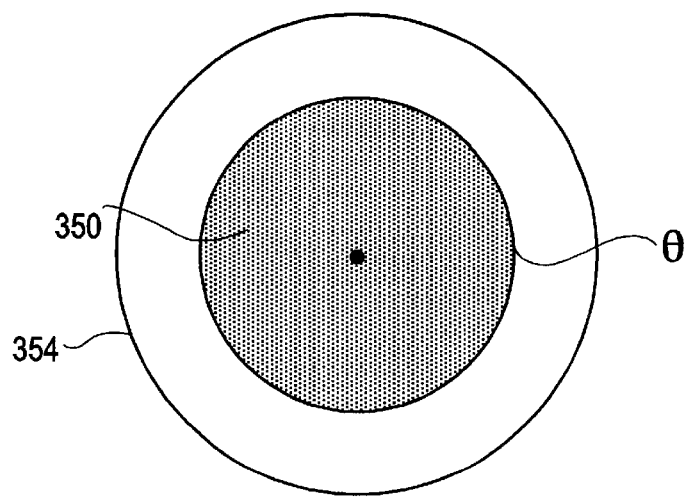
FIG. 12 is a plan view of the field of view showing the operation of a weighting function.
Figure 11:
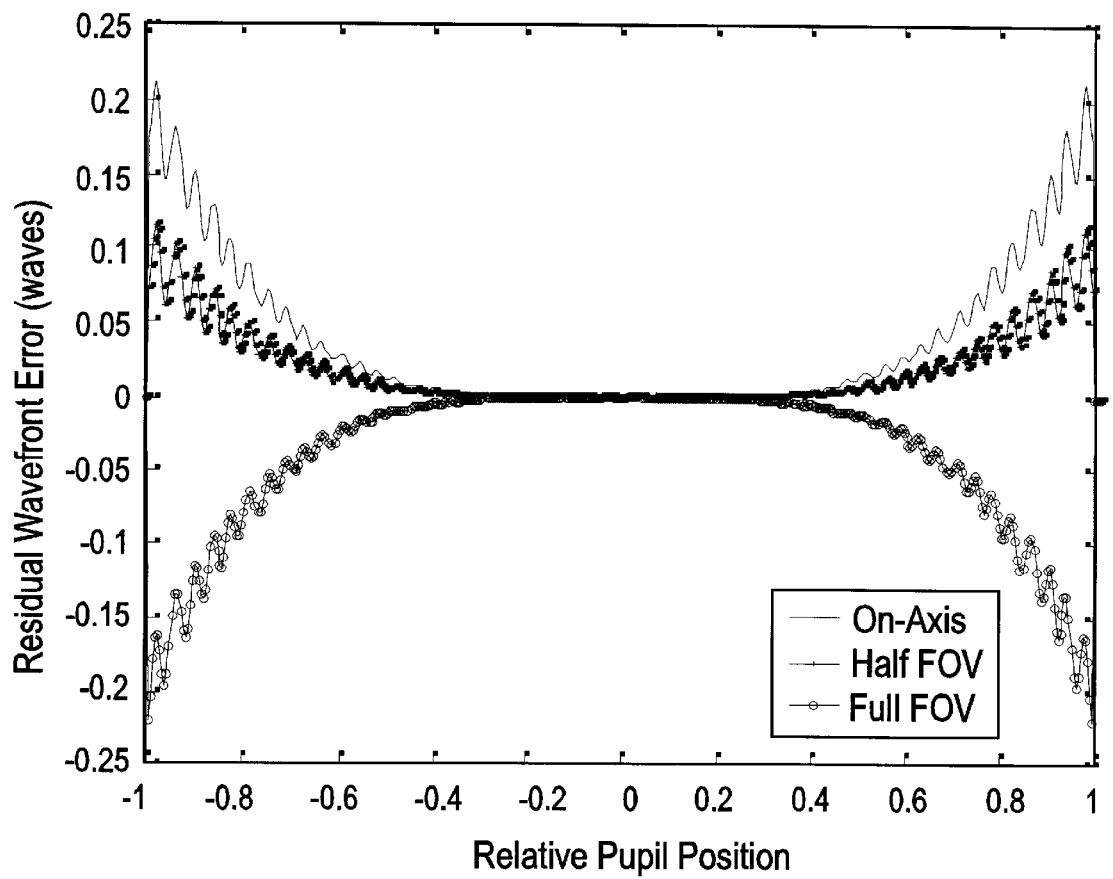
FIG. 11 depicts the residual wavefront error (vertical axis) versus relative pupil position for the primary mirror (horizontal axis) using equation 6.

Including the weighting function in equation 6 provides the following equation:

$$\omega_m = Sw \left[ \frac{\cos\frac{(FOV)}{FOV} + \sin(FOV) - \frac{1}{FOV}}{\cos\frac{(M_\infty FOV)}{M_\infty^2 FOV} + \frac{\sin(M_\infty FOV)}{M_\infty} - 1/M_\infty^2 FOV} \right] \quad (7)$$

where $S = H(H^tH)^{-1}H^t$, after including the weighting function, the residual wavefront error is shown in FIG. 11 and the portion 350 of the field of view 354 over which the residual wavefront is minimized in FIG. 12. This weighting function changes the residual wavefront values. The on-axis Strehl ratio is 0.90 and the edge-of-field Strehl ratio is also 0.90. The mid-field angle values have larger Strehl ratios; however, a system designed with equation 5 and this weighting function 6 will have diffraction limited image quality across the entire field of view.

In summary, equation 4 takes into account multiple field angles when the actuator values are calculated. As a result, the deformable mirror will be commanded to the shape that will allow the best overall image quality across the entire field of view. Implementation of equation 4 reduces the on-axis correction from 0.99 to 0.90, but it also improves the edge of field correction from 0.62 to 0.90. This results in diffraction limited imaging across the entire field of view.

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. The embodiments described here and above are further intended to explain best modes for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A remote sensing system for viewing a celestial body, comprising:
   (i) a spacecraft for orbiting the celestial body; and
   (ii) an optical system on the spacecraft, the optical system including:
      (a) a primary mirror for receiving incoming radiation;
      (b) a secondary mirror in optical communication with the primary mirror and for receiving radiation reflected by the primary mirror;
      (c) a deformable mirror in optical communication with the secondary mirror for receiving radiation reflected by the secondary mirror;
      (d) a plurality of actuators engaging the deformable mirror for forming a surface of the deformable mirror surface into a plurality of differing shapes;
      (e) a wavefront sensor in optical communication with at least one of the primary, secondary, and deformable mirrors for measuring a wavefront of radiation reflected by the at least one of the primary, secondary, and deformable mirrors; and
      (f) a controller for receiving a signal indicative of the wavefront measurement, generating a control signal to alter the shape of the deformable mirror, and for forwarding the control signal to each of the plurality of actuators to form the deformable mirror into one of the plurality of differing shapes.

2. The system of claim 1, wherein the primary mirror has a field of view angle that is at least about 1 degree.

3. The system of claim 1, the optical system further comprising:
   (g) a radiation source for emitting primary radiation, the primary radiation being directed by one or more of the primary, secondary, and deformable mirrors into the atmosphere of the celestial body to create secondary radiation that is received by the at least one of the primary, secondary, and deformable mirrors and directed to the wavefront sensor.

4. The system of claim 2, the optical system further comprising:
   (h) a tilt controller; and
   (i) a focus controller.

5. The system of claim 1, wherein the primary mirror is at least one of a segmented mirror, an electrostatically-controlled membrane mirror, an inflated mirror, an unfurled or rolled mirror, a mirror constructed in space, a sparse aperture mirror, and discrete mirrors deployed on separate spacecraft.

6. A method for viewing a celestial body from a spacecraft, the spacecraft including an optical system comprising a primary mirror and at least one of a secondary mirror and a deformable mirror, at least one of the primary mirror, the secondary mirror, and deformable mirror engaging a plurality of actuators, comprising:
   (a) determining a respective amplitude for each of the actuators based on a wavefront error at a nonzero field angle within a field of view of the primary mirror;
   (b) generating a respective control signal for each of the plurality of actuators based on the respective amplitude; and
   (c) displacing each of the plurality of actuators based on the respective control signal.

7. The method of claim 6, wherein the determining step is performed for a plurality of field angles having differing magnitudes.

8. The method of claim 6, wherein in the determining step the respective amplitude for each of the plurality of actuators is a function of an angular magnification of the optical system and the field angle.

9. The method of claim 8, wherein the nonzero field angle includes a range of angles.

10. The method of claim 6, further comprising repeating the determining, generating, and displacing steps for a second nonzero field angle that is different from the nonzero field angle.

11. The method of claim 6, wherein at a first time an object in the field of view is located at the nonzero field angle and at a second time that is different from the first time the object is in the field of view and is located at a second field angle that is different from the nonzero field angle and further comprising:
   (d) determining a second respective amplitude for each of the actuators based on the wavefront error at the second field angle;
   (e) generating a second respective control signal for each of the plurality of actuators based on the second respective amplitude; and
   (f) displacing each of the plurality of actuators based on the second respective control signal.

12. The method of claim 6, wherein in the determining step the amplitude is a function of a respective influence function for each of the plurality of actuators, an on axis wavefront error of the primary mirror, an angular magnification of the optical system, and the field of view of the optical system.

13. The method of claim 6, further comprising:
   (d) illuminating a selected area of atmosphere surrounding the spacecraft with radiation to produce secondary radiation;
   (e) directing the secondary radiation using the primary mirror and the secondary mirror to a wavefront sensor;
   (f) detecting a wavefront of the secondary radiation with the wavefront sensor;
   (g) forwarding a signal related to the detected wavefront to a controller; and wherein the control signal controls the figure or phase of at least one of the primary, secondary, and deformable mirrors.

14. The method of claim 6, wherein in the determining step the wavefront error is substantially minimized over the entire field of view of the optical system.

15. The method of claim 6 wherein the primary mirror has a field of view angle that ranges from about 1 to about 150 degrees.

16. The method of claim 6, wherein in the generating step the control signal is based on the following equation:

$$\omega_m(x, y) = [m'(x, y) \otimes \{m'(x, y) \otimes \omega(x, y)\} \text{comb}$$
$$\left(\frac{x}{\Delta x}, \frac{y}{\Delta y}\right)](M_\infty \sin(\theta)/\sin(M_\infty\theta)), \text{ where}$$

$\omega_m(x,y)$ defines the deformable mirror surface;
m'(x,y) is the influence fumction of the plurality of actuators;
$\omega(x,y)$ is the wavefront error of the primary mirror;
x is the position along the x axis at the deformable mirror;
y is the position along the y axis at the deformable mirror;
$\Delta x$ is the distance between adjacent actuators in the x axis at the deformable mirror;
$\Delta y$ is the distance between adjacent actuators in the y axis at the deformable mirror;
M is the angular magnification of optical system; $\theta$ is the nonzero field angle;
$\otimes$ refers to convolution; and
comb refers to a comb function.

17. A method for controlling the figure and phase of a primary mirror in an optical system located on a spacecraft, the optical system including a deformable mirror engaged with a plurality of actuators for forming the surface the deformable mirror into a plurality of differing shapes, comprising:

(a) illuminating a selected area of atmosphere surrounding a celestial body with radiation to produce secondary radiation;
(b) directing the secondary radiation using the primary mirror and a moveable secondary mirror to a wavefront sensor;
(c) detecting a wavefront of the secondary radiation with the wavefront sensor;
(d) forwarding a signal indicative of the wavefront to a controller;
(e) determining a respective amplitude for each of the actuators based on a wavefront error at a nonzero field angle within a field of view of the primary mirror;
(f) generating a respective control signal for each of the plurality of actuators, based on the respective amplitude, to control the figure or phase of the deformable mirror; and
(g) displacing each of the plurality of actuators based on the respective control signal.

18. The method of claim 17, wherein the determining step is performed for a plurality of field angles having differing magnitudes.

19. The method of claim 17, wherein in the determining step the respective amplitude is a function of a respective influence function for each of the plurality of actuators, an on axis wavefront error of the primary mirror, and an angular magnification of optical system.

20. The method of claim 17, further comprising repeating the determining, generating, and displacing steps for a second nonzero field angle that is different from the nonzero field angle.

21. The method of claim 17, wherein at a first time an object in the field of view is located at the nonzero field angle and at a second time that is different from the first time the object is in the field of view and is located at a second field angle that is different from the nonzero field angle and further comprising:

(h) determining a second respective amplitude for each of the actuators based on the wavefront error at the second field angle;

(i) generating a second respective control signal for each of the plurality of actuators based on the second respective amplitude; and
(j) displacing each of the plurality of actuators based on the second respective control signal.

22. The method of claim 17, wherein the primary mirror has a field of view angle that is at least about 1 degree.

23. The method of claim 17, wherein in the generating step each respective control signal is based on the following equation:

$$\omega_m(x, y) = [m'(x, y) \otimes \{m'(x, y) \otimes \omega(x, y)\} \text{comb}$$
$$\left(\frac{x}{\Delta x}, \frac{y}{\Delta y}\right)](M_\infty \sin(\theta)/\sin(M_\infty\theta)), \text{ where}$$

$\omega_m(x,y)$ defines the deformable mirror surface;
m'(x,y) is the influence function of the plurality of actuators;
$\omega(x,y)$ is the wavefront error of the primary mirror;
x is the position along the x axis at the deformable mirror;
y is the position along the y axis at the deformable mirror;
$\Delta x$ is the distance between adjacent actuators in the x axis at the deformable mirror;
$\Delta y$ is the distance between adjacent actuators in the y axis at the deformable mirror;
$M_\infty$ is the angular magnification of optical system; $\theta$ is the nonzero field angle;
$\otimes$ refers to convolution; and
comb refers to a comb function.

24. An optical system for viewing a celestial body from a spacecraft, the optical system comprising:

(a) a primary mirror;
(b) a secondary mirror;
(c) a deformable mirror, wherein at least one of the primary mirror, the secondary mirror, and deformable mirror engages a plurality of actuators;
(d) determining means for determining a respective amplitude for each of the actuators based on a wavefront error at a nonzero field angle within a field of view of the primary mirror; and
(e) generating means for generating a respective control signal for each of the plurality of actuators based on the respective amplitude, wherein each of the plurality of actuators are displaced based on the respective control signal.

25. The system of claim 24, wherein the determining means determines an amplitude for each of the actuators and for each of a plurality of field angles having differing magnitudes.

26. The system of claim 24, wherein the respective amplitude for each of the plurality of actuators is a function of the angular magnification and field angle.

27. The system of claim 26, wherein the nonzero field angle includes a range of angles.

28. The system of claim 24, wherein at a first time an object in the field of view is located at the nonzero field angle and at a second time that is different from the first time the object is in the field of view and is located at a second field angle that is different from the nonzero field angle and firter comprising:

(d) determining means for determining a second respective amplitude for each of the actuators based on the wavefront error at the second field angle; and (e) generating means for generating a second respective control signal for each of the plurality of actuators based on the second respective amplitude, wherein each of the plurality of actuators is displaced based on the second respective control signal.

29. The system of claim 24, wherein the determining means substantially minimizes the wavefront error over the entire field of view of the optical system.

* * * * *